Figure 1:
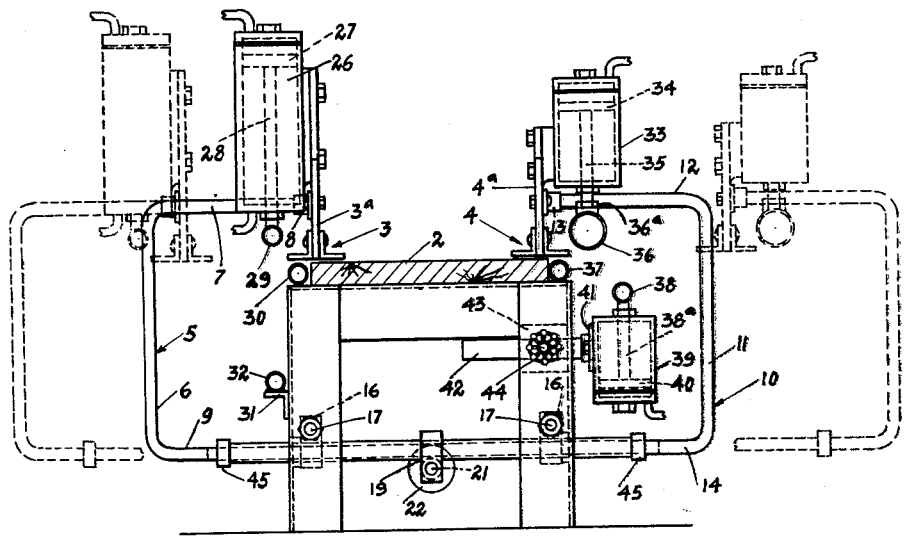

INVENTOR.
MATTHEW E. HARTER.

BY Christy, Parmelee & Strickland

ATTORNEYS.

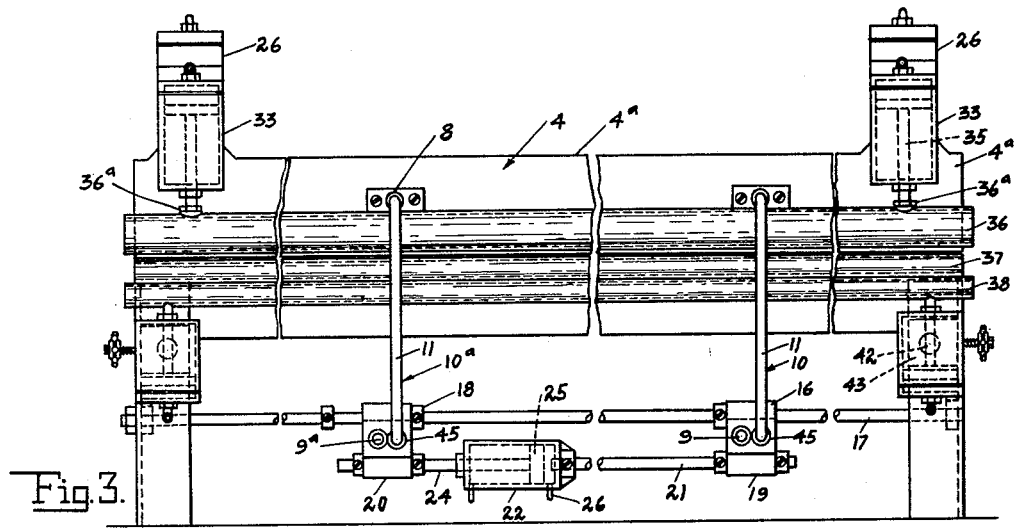
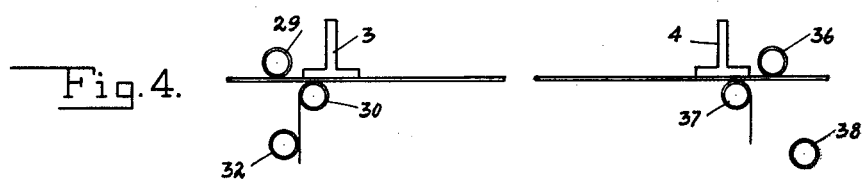
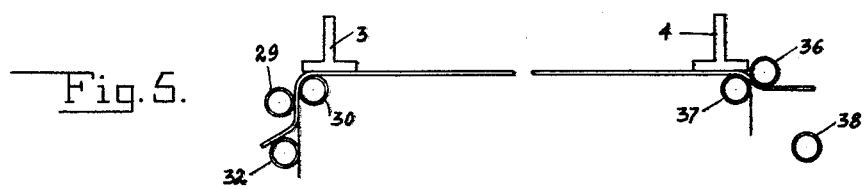
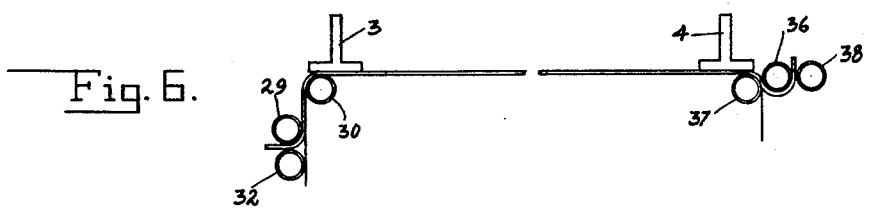
INVENTOR.
MATTHEW E. HARTER.
BY
Christy, Parmelee & Strickland
ATTORNEYS.

United States Patent Office 3,147,326
Patented Sept. 1, 1964

3,147,326
METHOD OF AND APPARATUS FOR POST-FORMING PLASTIC SHEETS
Matthew E. Harter, 4924 Carlyn Drive, Pittsburgh, Pa.
Filed Apr. 4, 1960, Ser. No. 19,531
11 Claims. (Cl. 264—296)

This invention is for the post-forming of thermoplastic resin-bonded laminated sheet material and relates particularly to the post-forming of various parts of a sheet in a single operation to produce a complex shape, such as a sink top or bar top.

More particularly this invention is adapted to the manufacture of bar and counter tops and sink tops or the like from sheets of material formed of laminated resin and cloth or paper, of which material sold under the trade-mark "Formica" is typical.

Present methods of post-forming plastic sheets, particularly large sheets such as sink or bar tops, result in a great deal of imperfect product. In apparatus as presently employed, a heater is brought into position over the area of the sheet to be formed. When the sheet has been heated, the heater is moved out of position and a forming element is moved quickly and forcibly against the sheet in an effort to complete the shaping of the plastic sheet before the heat has been lost. This results in cracking the sheet and ruining the piece.

The present invention has for its object to provide a method of and apparatus for both heating and forming the sheet so that heat may be applied while the sheet is being deformed.

A further object of my invention is to provide an apparatus wherein a portion of the sheet adjacent the area of bending is clamped and firmly held so that the bending may be evenly and accurately performed.

A further principal object of this invention is to provide a method by which a sheet of laminated plastic material can be post-formed along both edges in a single operation or in progressive stages without manipulation of the sheet between forming steps. A still further object of the invention is to provide an apparatus for the post-forming of plastic sheet material of the kind referred to which is of novel and unique construction.

Figure 2:
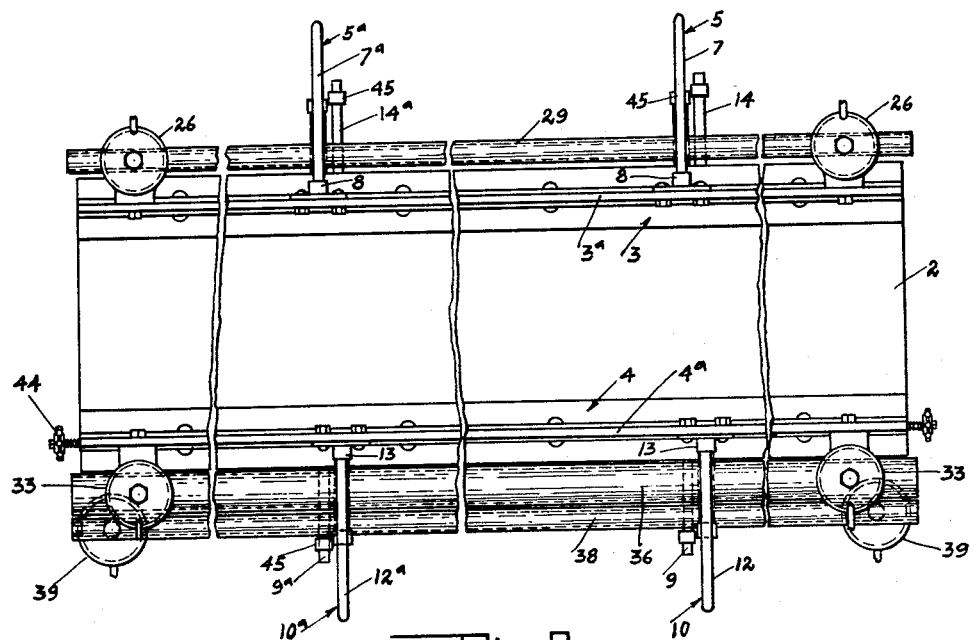

These and other objects and advantages are secured by my invention which may be more fully understood by reference to the accompanying drawings which illustrate more or less schematically one form of apparatus for accomplishing my invention and the various stages in the method of forming the sheet. In the drawings:

FIG. 1 is a generally schematic end view of an apparatus embodying my invention, and designed to accomplish the method, the combined heating and forming elements being shown in section for purposes of clarification;

FIG. 2 is a plan view of the apparatus shown in FIG. 1;
FIG. 3 is a side elevation of the apparatus;
FIG. 4 is a schematic view showing the first step in the bending of the sheet material to form a bar top or sink top;
FIG. 5 is a view similar to FIG. 4 showing the next stage in the operation;
FIG. 6 is a view similar to FIG. 5 showing the final state of forming the sheet; and
FIG. 7 is an end view showing the contour of the finished sheet.

A typical sink or bar top has the contour shown in FIG. 7. There is a main flat control area A, a non-drip forward edge B with a downturned apron C, and at the back and along the opposite edge there is an upright splash board D with a rearwardly-extending flange E. The bar or sink top is made from laminated plastic sheets of the type referred to, and may be formed in any length required, up to the full length of the commercially available plastic sheet material.

Referring first to FIGS. 1 to 3, there is disclosed a flat table 2 having supporting legs. The width of the table is less than the full width of the sheet material to be processed, so that when a sheet is placed on the table, its longitudinal edges will extend outwardly beyond the edges of the table. The length of the table is such that it will accommodate and provide coextensive support for the maximum length of sheet to be processed.

Extending along one longitudinal edge of the table and coextensive with the length thereof is a rigid clamping or hold-down shoe 3. As here shown, the hold-down shoes have a flat bottom surface confronting the table and an upwardly-extending portion 3a. The hold-down shoe may be formed as shown of angle sections secured to a central metal plate. Extending over the other longitudinal edge of the table is a similar hold-down shoe 4 with an upwardly-extending web 4a.

The shoe 3 is supported on two similar supporting members 5 and 5a, each member having a vertical reach 6 with a horizontal upper arm 7 at the top turned inwardly toward the shoe and pivotally secured at its inner end to the shoe at 8. The member 5 has a lower horizontal arm 9 that extends crosswise under the table. The member 5a has a similar lower horizontal arm 9a that also extends crosswise under the table.

The shoe 4 is similarly carried on two supporting members 10 and 10a, which are like the members 5, each having a vertical portion 11 and an upper horizontal arm 12 pivotally secured at its inner end to the shoe at 13. Member 10 has a lower horizontal portion 14 that extends crosswise under the table, and member 10a has a similar lower horizontal arm 14a extending crosswise under the table.

The lower cross arms 9 and 14 of the supports 5 and 10 are slidably and rotatably passed through guide blocks 16 which are slidable on guide rods 17 at each side of the table. Lower cross arms 9a and 14a are slidably and rotatably passed through guide blocks 18 that are also slidably carried on the rods 17. The lower arms 9 and 14 are also slidably and rotatably engaged in a center block 19 (see FIG. 1) midway between the rods 17, and lower arms 9a and 14a are similarly engaged in a center block 20.

Center block 19 is attached to a rod 21, which in turn is connected at 22 to a fluid pressure cylinder 23. Center block 20 is connected to a rod 24 on which is a piston 25 in the cylinder 23.

Upon application of pressure to the cylinder through inlet pipe 26, the cylinder and piston move in opposite directions, swinging the supports 5 and 10 and 5a and 10a from a vertical position toward a diagonal or angular position, thus exerting a downward pull on the shoes 3 and 4 respectively. Movement of the piston and cylinder in the opposite direction restores the supports to a vertical position, thereby raising the shoes.

The lower horizontal arms 9, 9a, 14 and 14a, being slidable in the guide blocks 16 and 18 and in the center blocks 19 and 20 enables the shoes to be pulled sideways from a position over the table to a position at one side of the table, as indicated by the dotted lines in FIG. 1. Since the hold-down shoe may be moved to one side of the table, the entire area of the table is accessible for placing sheets of material thereon and removing formed sheets, and the extent of vertical movement need be little more than the thickness of the sheet plus any clearance necessary to clear any upwardly-turned part of the sheet that might otherwise interfere with the lateral movement of a shoe.

The hold-down shoe 3 has two or more pressure cylinders 26 secured to the vertical web 3a thereof. These cylinders are in longitudinal alinement and in each cylinder is a piston 27 with a downwardly-extending piston rod 28 that passes through the bottom of the cylinder, and to which is secured a hollow bending tube or element 29. This bending tube may be moved up and down through the application of fluid pressure to opposite ends of the cylinder 26, and 26a and 26b designated fluid pressure pipes for supplying fluid under pressure to the opposite ends of the cylinder.

Provision is made for heating the tubular element 29. This may be accomplished by a gas burner located at one end of the tube for projecting a flame through the tube, or by a burner extending lengthwise of the tube and having burner openings at intervals therealong, or by electric heaters within the tube 11, or by fluid such as "Dowtherm" or some similar high boiling point liquid that is heated by a boiler and circulated through the tube 11. The heating means per se constitutes no part of the present invention, all of these arrangements being well known expedients. Gas heat is preferable because of the low initial cost of the apparatus and the relatively even distribution of heat along the length of the tube 29 that can be secured by its use.

Embedded in the top corner of the table, as indicated at 30 is a tube similar to 29, but which is stationary, and it forms the longitudinal corner edge of the table, its top being tangent to the table top, and its side being tangent to the vertical side of the table. Secured on fixed brackets 31 is still another such tube 32 that is positioned close against the side wall of the table at a distance spaced below the tube 30.

With the mechanism so far described, it will be seen that the tube 29 may be moved up and down with the shoe 3, and may also be moved vertically relative to the shoe and to the tubes 30 and 32. The vertical plane of movement of the tube 29 is close to the side of the table along which it moves, but spaced therefrom a distance such that the inner face of tube 29 will be about equal to the thickness of the sheet material being formed.

The shoe 4 as viewed in FIG. 1 also supports fluid-pressure cylinders 33 similar to the fluid-pressure cylinders 8, the cylinder being carried on the upright plate portion 4a of the shoe. In each of the cylinders 33 there is a piston 34 with a rod 35 connected to a tube 36 which is similar to tube or element 29, and the other tubes or heated forming elements previously described but is here shown as being of larger diameter. Element or tube 36 is connected to the piston rods on which it is carried by coupling 36a to enable different diameter elements to be interchangeably used. These may be any convenient form of coupling, as a telescoping connection or thread coupling similar to a pipe joint. Along the other longitudinal edge of the table there is another one of these tubes or heated forming elements 37 embedded in the corner of the table, and forming the other top corner edge of the table. Tube 36 is movable in a vertical plane similar to tube 29, its inner surface being spaced from the left side of the table only about the thickness of the sheet material being operated upon.

Below the tube or element 36 is another tubular heated forming element 38. It is carried on piston rods 38a at each end, these rods extending upwardly from fluid-pressure cylinders 39, the rods having pistons 40 in the cylinders. Each of the cylinders 39 are carried on a bracket 41 at the end of a horizontal slide rod 42 to enable the element 36 to be adjusted toward or away from the side of the table along which it extends. Rods 42 are carried in guides 43 on the tube legs, and they may be manually adjustable or cylinders may be used also for this purpose. I have here shown them to be manually adjustable with a clamping screw 44 to clamp the rods in adjusted position.

Each of the fluid-pressure cylinders 33 and 39 are provided with fluid-pressure connections similar to the connections for the cylinders 26. All of the heated forming elements are substantially coextensive in length, being at least as long as the longest sheet which the table will support, or substantially co-extensive with the length of the table.

In the arrangement at the side of the table as viewed in FIG. 1, it will be seen that the tube 29 may raise and lower with the hold-down shoe 3, and may also move up and down relative to it.

In the practice of my invention the various forming tubes or heated forming elements 29, 30, 32, 36, 37 and 39 are brought up to operating temperature, which should be somewhere in the neighborhood of 312 to 325° F. Temperatures substantially below this are not effective for post-forming the laminated material, and temperatures substantially above this are likely to result in charring the material. With the clamping shoes pulled to the sides of the table a sheet of laminated plastic is placed on the table with the longitudinal edges of the sheet projecting beyond the longitudinal edges of the table. This is indicated by the heavy dotted line in FIG. 1. With the plastic sheet properly located on the table, the clamping shoes 3 are brought into position and cylinder 22 is operated to pull the shoes down to firmly press the sheet against the table top and hold it against movement. The clamping shoes preferably extend over the tubes 30 and 37. With the clamping shoes lowered, the heating and forming elements 29 and 36 then are lowered to contact the projecting edges of the sheet at the top of the sheet to heat the sheet, while the heating elements 30 and 37 apply heat at the same time to the lower surface of the sheet at the corner edges of the table. The plastic sheet material which is relatively thin is quickly brought up to bending temperature by contact with the heating elements. Pressure is then applied to the cylinder 33 to move the tube 36 down toward, but not to, the level of the center of the tube 30. This is shown in FIG. 5, where the right-hand edge of the sheet is bent downwardly from the plane of the top of the table a distance which, as shown in the figure, is about equal to the diameter of the tube 30. At the same time pressure is applied to the cylinder 26 to move the heating and forming element or tube 29 downwardly past the center of the tube 30, folding the edge of the sheet which overhangs the left-hand side of the table down against the side of the table as also shown in FIG. 3. However, the downwardly-turned edge of the left-hand side of the sheet as viewed in FIG. 5 at the lower portion is obstructed from folding in parallel with the side of the table by contact with the fixed heated tube 32, so that this lowermost edge portion tends to turn outwardly toward the left, as shown in FIG. 5, relative to the side of the table.

When this condition has been achieved and the plastic sheet has been so heated by contact with the several heating elements, the tube 29 is forced down to the full limit of its travel toward the tube 32. This pinches the outwardly-turned lower edge of the left-hand side of the strip outwardly at right angles as shown in FIG. 4. Pressure is applied to the cylinder 39 to raise the heating element 38 to a position where it engages the depressed right-hand edge of the strip. Applying heat to the part of the strip which it engages, the heating and forming element 38 continues to travel up until its center is in the same horizontal plane as the center of the heating tube 29, and above the center of the heating member 30. This bends the very right-hand edge portion of the projecting margin of the sheet upwardly. Upon completion of this, the parts are restored to the position shown in FIG. 1, the shoes are moved to the dotted line positions indicated in FIG. 1, and the formed piece is removed and turned over, then having the shape shown in FIG. 7. The heating and forming elements 29, 30 and 32 have cooperated to form the anti-drip bead B, and the downwardly-turned apron C. The forming elements 29, 30 and 32 have cooperated to form the splash board D, and the laterally-turned flange E and all of the operations to form the complex shape are effected without disturbing the sheet after it is clamped in position. When a piece has been thus formed in a single and continuous operation, it is completed, and the plywood which in present practice is usually applied to the sheet before the sheet is bent, can now be easily secured to the bottom of the area A with a separate piece at the back of the splash board D. However, plywood may, in the present invention, be applied before the sheet is formed into shape as is now the practice.

Not only does the apparatus and process herein described permit the sheet if desired being formed and then plywood applied to it, thereby reducing the weight of the piece to be handled during the post-forming operation, but it enables all of the parts to be formed rapidly, accurately and in a single operation which progresses without interruption from beginning to end. There is no need to remove the piece from the forming apparatus and turn it over, and heat and pressure are applied together, instead of the heater being moved out of the way for the forming element to operate. Thus the plastic sheet is post formed under favorable conditions and damage to the product is reduced. Also, with this invention, narrow strips of the sheet material may be clamped under one of the shoes 3 or 4 and shaped by the cooperating heated elements. In other words, the invention is not limited to bending both edges of the strip at once. By adjusting forming element 38 closer to or further away from the table and/or changing element 36 to one of different diameter; the curvature of the roll or anti-drip B may be changed. In bar tops this is for example, a wide gradual roll, whereas in a sink top it is usually a steep short radius curve.

Collars 45 may be provided on the lower arm elements 9, 9a, 14 and 14a at predetermined positions to limit the sideways movement of the clamping shoes.

While I have shown and described one specific embodiment of my invention, it will be understood that this is by way of illustration. It is not necessary that the various heated forming elements be circular in contour, but it is desirable that those surfaces over which the plastic is bent shall be curved to avoid sharp corners where the bending stresses might be too severely localized.

I claim:

1. Apparatus for post-forming plastic laminated sheets comprising a stationary supporting table having a top and sides, a heater member embedded in the top thereof and constituting the longitudinal top corner edges thereof, a longitudinal clamping means above the table extending along each longitudinal edge of the table, means for moving the clamping means vertically with respect to the table into and out of clamping engagement with a plastic sheet placed on the table, a combined heating and forming element extending lengthwise of the table movable vertically relatively to the clamping means in a plane parallel with and alongside each longitudinal edge of the table from a level above the table top to a level below the top of the table, and means for effecting such vertical movement of the combined heating and forming elements, whereby both overhanging edges of a sheet of plastic placed on the table may be formed while the sheet remains clamped and each edge is shaped with heat applied to both surfaces thereof between the heater embedded in the table edge and the vertically movable heating and forming element.

2. Apparatus for post-forming plastic sheets as defined in claim 1 in which the said longitudinal clamping means are mounted for movement from a position over the table to a position clear of the table top so as to enable a sheet of plastic wider than the table to be placed thereon and removed therefrom free of interference from the clamping means.

3. Apparatus for post-forming plastic laminated sheets as defined in claim 1 in which there is another heating and forming member fixed against one longitudinal side of the table at a level below the top thereof and below the downward limit of travel of the vertically-movable heating and forming member above it for turning the edge portion of a plastic sheet outwardly as a part of the sheet is pressed in against the side of the table.

4. Apparatus for post-forming plastic laminated sheets as defined in claim 3 in which there is also a combined heating and forming member positioned along the opposite side of the table and movable in a vertical plane parallel with said side but to the outside of the plane of movement of the vertically-movable heating and forming member above it and movable from a level below the top of the table to a level where its upper surface projects above the level of the top of the table whereby a reverse bend may be formed in the edge of the sheet engaged thereby.

5. Apparatus for post-forming plastic sheets as defined in claim 4 in which the last-named heating and forming means is adjustable horizontally toward and away from the table.

6. Apparatus for forming plastic sheets as defined in claim 4 in which the first and second movable heated forming elements are mounted on the clamping means for movement up and down therewith and are also movable relatively to said clamping means.

7. Apparatus for forming plastic sheets into sink or bar tops and the like comprising a table having a top and vertical sides and of less width than the plastic sheet to be formed and of a length of said sheet so that the sheet may be supported throughout its entire length with its two edges extending beyond the two side edges of the table, the table having heating and forming units embedded in the top along each longitudinal edge for heating a plastic sheet that is placed thereon, a fixed structure over the table having clamping members suspended therefrom positioned over the table near the longitudinal edges of the table, said clamping members being also movable on said fixed structure from a position over the table to a position at one side of the table, means for raising and lowering the clamping members relatively to the table for clamping a sheet on the table and effective close to the edges of the table, a heated forming element mounted for vertical movement in a plane close to but clear of the plane of one vertical side of the table, said heated forming element being movable from a level above the table to a level below the top, another heated forming element positioned along the same side of the table and movable at the lower limit of movement of the said movable heating and forming element, another heating and forming element mounted for vertical movement from a level above the table to a level below the table top in a vertical plane close to but clear of the second longitudinal side of the table, means for raising and lowering said second vertically-movable heated forming element, and a third heated forming element along the second side of the table movable in a vertical plane from a level below the top of the table to a level above the table top, the plane of the last-named heated forming element being sufficiently remote from the side of the table along which it moves upwardly past the second-named movable heated forming element so that a reverse bend may be formed thereby, means for moving the third heated forming element up and down, all of said movable heated forming elements being as long as the sheet which they operate upon.

8. The method of post-forming a plastic sheet to produce a sink or bar top having a flat central area with a no-drip bead along its front edge from which depends an apron and having a splash board along its rear edge extending upwardly from the plane of the flat area with an outwardly-turned lip extending laterally from the top of the splash board, which comprises placing the sheet top face down on a table having a flat top and vertical sides and with the upper surface of the plastic sheet exposed, clamping the sheet on the table with its margins projecting beyond the front and rear edges of the table top, applying heat to the sheet throughout its length along the place where the sheet overhangs the table top and simultaneously applying downward pressure and heat to the top of the overhanging marginal portion of the sheet to bend it down against the side of the table while pressing the extreme flange-forming portion of the edge being so bent against a heated member that deflects it away from said side of the table, applying heat to the area of the other margin of the sheet where it overhangs the table, pressing the projecting margin down below the level of the table top and while holding it against the upper corner of the table bending the extreme apron-forming portion of the strip vertically upward between heated elements, thereby completing the forming of the top in an inverted position, heat being continuously applied to at least one surface of the sheet in the area where a bend is being made during the entire pending thereof and all bending operations being initiated between two heated surfaces.

9. Apparatus for post-forming plastic sheets comprising a sheet supporting table, having a top and sides, a clamping shoe movable vertically toward and away from the top into and out of sheet clamping position, a heated element extending along a longitudinal edge of the table forming the corner of the table, a heated forming element supported for movement vertically relatively to the clamping shoe and relatively to the table from a position above the top of the table downwardly past said longitudinal edge whereby the protruding margin of a sheet of plastic material on the table may be heated from below by the heated corner forming element and from above by said heated forming element, and means for applying pressure to the vertically movable heated forming element to deform such a protruding edge of the sheet.

10. Apparatus for post-forming plastic sheets as defined in claim 9 wherein there is a second vertically movable heated forming element parallel with the first and normally below the plane of the table top, and means for applying pressure to said second heated forming element to raise it to a level above the table top for deforming such protruding edge of a plastic sheet upwardly, said two heated forming elements being movable in different vertical planes.

11. Apparatus for post-forming plastic sheets as defined in claim 9 in which the heated forming element and means for operating the same to apply pressure thereto are carried by the clamping shoe to move vertically with the clamping shoe, the clamping shoe being carried on supporting levers extending downwardly from the shoe, and means beneath the table for rocking said levers in a vertical arc to raise or lower the shoe.

References Cited in the file of this patent

UNITED STATES PATENTS

| | | |
|---|---|---|
| 2,396,996 | Frost et al. | Mar. 19, 1946 |
| 2,420,119 | Boehm et al. | May 6, 1947 |
| 2,591,085 | McCall | Apr. 1, 1952 |
| 2,648,370 | Beach | Aug. 11, 1953 |
| 2,744,850 | Schofield | May 8, 1956 |
| 2,937,689 | Peterson | May 24, 1960 |